Aug. 8, 1939.    M. RICHTER    2,168,884
YARN-FEEDING MEANS
Filed July 21, 1937    7 Sheets-Sheet 2

INVENTOR:
Max Richter,
BY
ATTORNEY

Aug. 8, 1939.    M. RICHTER    2,168,884
YARN-FEEDING MEANS
Filed July 21, 1937    7 Sheets-Sheet 5

INVENTOR:
Max Richter,
BY
ATTORNEY

Aug. 8, 1939.  M. RICHTER  2,168,884
YARN-FEEDING MEANS
Filed July 21, 1937  7 Sheets-Sheet 6

INVENTOR:
Max Richter,
BY
Alfred E. Tschinger
ATTORNEY.

Aug. 8, 1939.   M. RICHTER   2,168,884
YARN-FEEDING MEANS
Filed July 21, 1937   7 Sheets-Sheet 7

INVENTOR:
Max Richter,
BY
Alfred E. Ischinger
ATTORNEY.

Patented Aug. 8, 1939

2,168,884

UNITED STATES PATENT OFFICE 2,168,884

YARN-FEEDING MEANS

Max Richter, West Reading, Pa., assignor to Textile Machine Works, Wyomissing, Pa., a corporation of Pennsylvania Application July 21, 1937, Serial No. 154,767

35 Claims. (Cl. 66—127)

My invention relates to yarn laying means for knitting machines, and particularly to mechanism for presenting yarn lengths in selected order to the machine needles, as in producing ringless stockings.

In operating the yarn carriers of a knitting machine in selected order or recurrent sequence, it has heretofore been suggested to obtain the result by various means; one such means comprising a special selector friction box for change of connection from one yarn carrier to another, and another means comprising mechanism for operating separate friction boxes connected to the respective yarn carriers.

In each of the above-mentioned prior devices, the selecting means depends upon a separate pattern device controlled from a drum or a chain and involving all of the linkages, cams, and other elements usually accompanying such means, as well as much special mechanism locally associated with the friction boxes and disposed at other places.

In the above mentioned, and other, machines it has further been usual to provide stops for the carriers in which the inertia of the friction boxes, as well as that of the carriers, has been imposed on the stops such that, especially in high speed operation, delays, expense and other undesirable effects, such as damage to the fabric and to the machine parts have been sustained.

The inertia of the friction box and its associated parts sometimes also causes incorrect timing between the carriers and the sinkers and dividers by causing slippage of the box relative to the friction rod at the beginning of strokes.

Among the objects of my invention are to overcome objections to the prior art structures, and to provide a device that is an improvement, and has advantages, thereover.

Another object of the invention is to provide a much simpler device for accomplishing the same purposes, wherein the number and complication of parts are reduced and, in the form for selecting a plurality of yarn carriers for operation in repeated cycles, the operation of the device is controlled by the yarn carriers.

Another object of the invention is to provide a mechanism in a form, as where it is operated in conjunction with a friction box, whereby a plurality of yieldable connections are provided between a friction rod and each yarn carrier, one of the connections yielding at one time or position in the knitting operation and another of the connections yielding at another time or position.

Another object of the invention is to provide in a knitting machine having a reciprocable element, such as a friction box driven by a friction rod, means for imparting to such element an initial impulse in addition to that imparted to it by its driving means whereby to avoid relative movement between the driving and driven reciprocable members due to the driving impulse of the driving member.

Another object of the invention is to provide, in combination with certain other features herein set forth, a shock distributor whereby shocks that have heretofore been localized, or borne by single members, at certain locations, have part of this shock removed therefrom and imposed on another member.

Another object of the invention is to do away with the requirement for a special selector friction box, to avoid a special mechanism for selectively operating a plurality of friction boxes, to provide an improved damping action between an actuator or driver and a yarn carrier whereby rebound of the carrier from its stops is prevented, and to provide a device that is an improvement over any prior device in which trip dogs and latches are employed as above mentioned.

A further object of the invention is to provide a device of the above-indicated character that is simple and durable in construction, economical to manufacture and effective in its operation.

With these and other objects in view, which will become apparent from the following detailed description of the illustrative embodiment of the invention shown in the accompanying drawings, my invention resides in the novel elements, features of construction and arrangement of parts in cooperative relationship as hereinafter more particularly pointed out in the claims.

In the drawings and description, only those parts necessary to a complete understanding of the invention have been set forth; further information as to the construction and operation of other elements not herein specifically pointed out, but which are usual and well known, being available in the pamphlet entitled "Full Fashioned Knitting Machines", copyright 1920, and in the "Reading" Full Fashioned Knitting Machine Catalogues, copyright 1929 and 1935, published by the Textile Machine Works, Reading, Pennsylvania, and in a pamphlet entitled "Knitting Machine Lectures", published in 1935 by the Wyomissing Polytechnic Institute, Wyomissing, Pennsylvania.

Referring to Figs. 1, 2, 4 and 7, the machine comprises, in general, a support or base including end frames 10, center frames, such as the center frame 14, a front beam 15, a back beam 19, and a center bed 24. Mounted on the base are a cam shaft 25, a back narrowing shaft 29, a narrowing head assembly H at each end of the machine, each including end stops S, an end stop spindle 30, end stop carrier nuts 34, a guide rod 35, narrowing nuts 39, a narrowing spindle 40, and a narrowing head actuating lever 44. A needle bar assembly N on the base includes needle bars, such as the bar 45, a needle bar bracket 49 for each needle bar, needles 50 and needle bar clamps 54. A cock box guide rail 55 and a connecting bar 59 are mounted on bracket portions 60 of the center bed 24. Carrier bars 1—8 are supported by brackets 64 mounted on the center bed 24, and further elements mounted on the base are a friction rod driving member 66, a friction box 70, plunger device P providing individual yielding drive connection between the friction box 70 and each of certain of the carrier bars, and holding means or rebound stops LS and RS for the carrier bars and mechanisms L and R. These stops are for operation by the bars to determine the sequence of operation of the bars by the device P.

Figure 2:
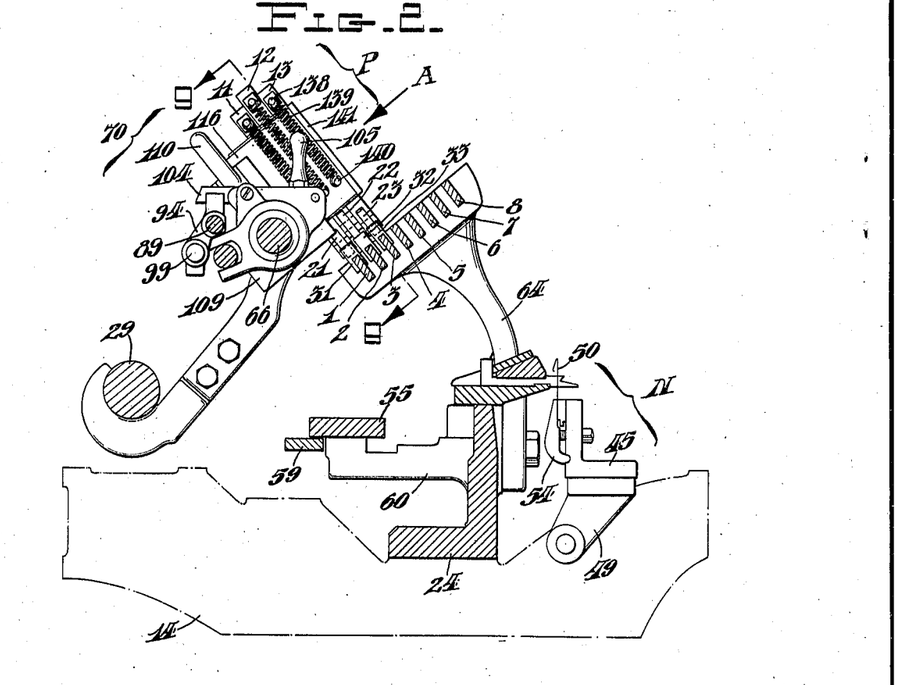
Fig. 2 is an enlarged sectional view taken along the line 2—2 of Fig. 1.
Figure 3:
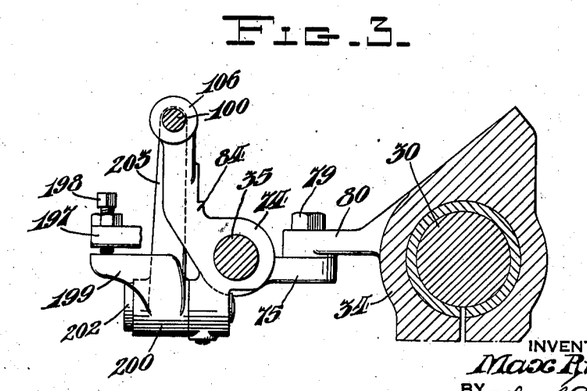
Fig. 3 is a sectional view taken substantially along the line 3—3 of Fig. 1.
Figures 4, 5, 6:
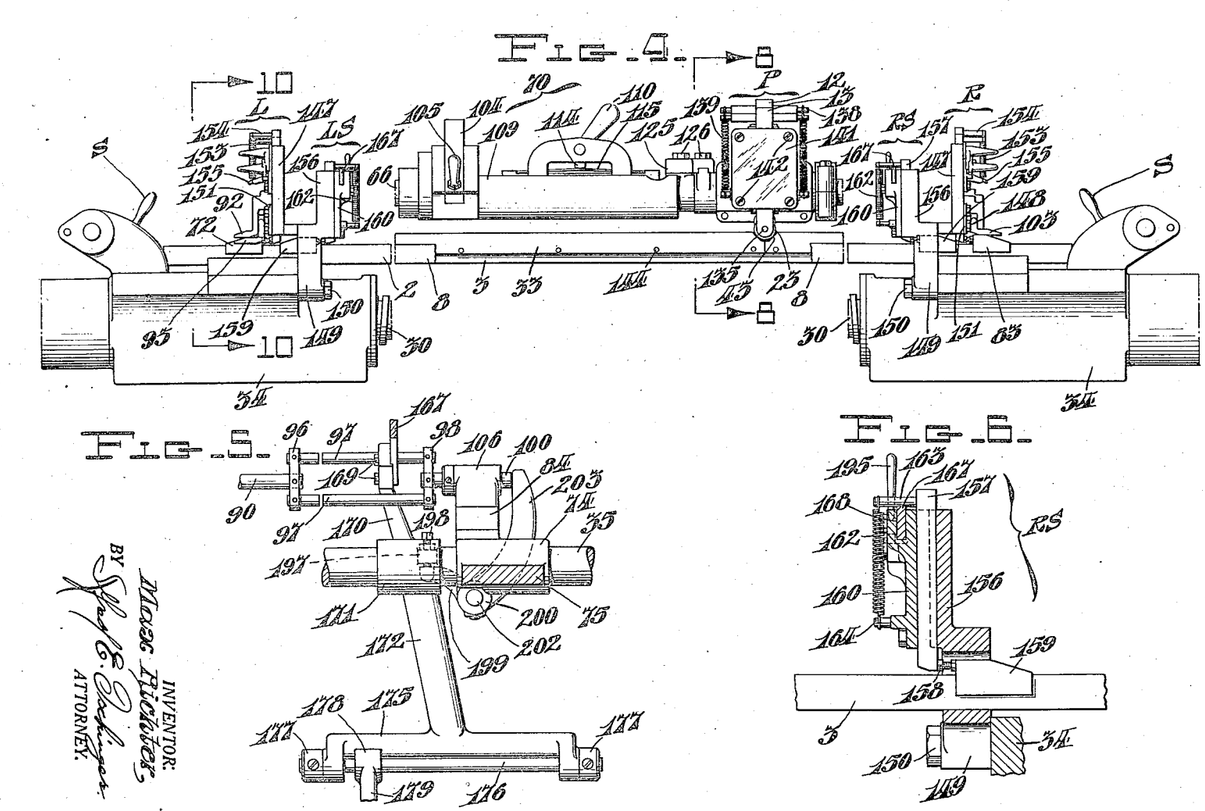
Fig. 4 is a view, in front elevation, taken in the direction of the arrow A of Fig. 2 of the mechanism shown at the top of Fig. 1.
Fig. 5 is a sectional view taken substantially along the line 5—5 of Fig. 7.
Fig. 6 is a sectional view taken along the line 6—6 of Fig. 7.

Brackets 74 on the end stop guide rods 35 have arms 75 secured, as by screws 79, Fig. 3, to arms 80 of the end stop carrier nuts 34. The brackets 74 have arms 84 which carry, at the left and right hand ends of the machine, rods 89 and 90, respectively, projecting toward each other and carrying at the adjacent ends thereof blocks 94 and 95 (Fig. 1), which blocks telescopically fit another rod 99 parallel, and adjacent to, the rods 89 and 90. The rods 89 and 90 are similarly supported in the brackets 74, as indicated in Fig. 5, in which the rod 90 has a cross bar 96 connected to two rods 97 parallel to the rod 90. Another cross bar 98 connects the rods 97 to each other and to a short rod 100 that is slidably journaled in a bearing portion or sleeve 106 for slight longitudinal movement therein, as will be hereinafter pointed out. As the narrowing heads H are operated toward and away from each other, the blocks 94 and 95 approach, and recede from, each other, respectively, to operate as stops for the friction box 70 which thereby engages the blocks at substantially the same instant that a yarn carrier bar engages its end stop S. This action prevents the concentrated impact of the bar and the box solely against the end stops and more widely distributes the impact. A lever 104 (Fig. 2) having a handle 105 is carried by the friction box 70 to operate as the direct impact element of the box against the blocks 94 and 95, and to enable the lever 104 to be thrown out of the path of the blocks when it is desired to move the associated yarn carrier out of the knitting field.

Figure 1:
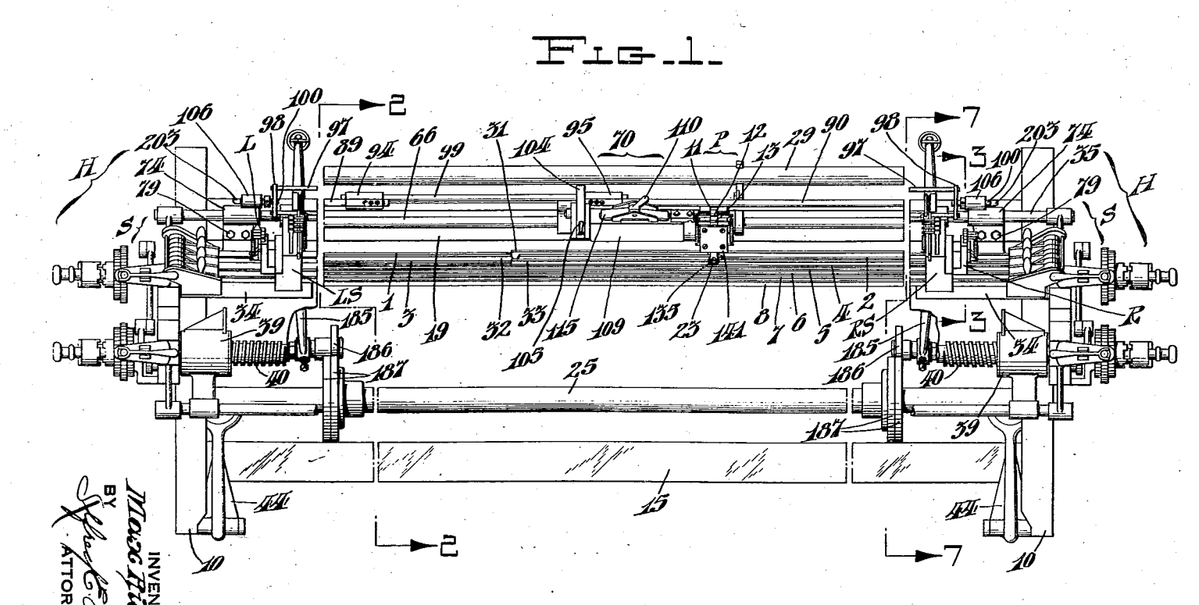
Figure 1 is a top plan view having distance breaks therein of a multi-section full fashion knitting machine including the invention.

The friction box 70, as seen in Figs. 1, 2 and 4, so far as its cooperation with the friction rod or driver 66 is concerned, is of usual character, embodying a housing 109, and a hand lever 110 having a portion 114 for compressing a bowed leaf spring 115 against the shoes whereby the latter grip the friction rod 66.

The device P is carried by the friction box 70 at one end thereof, and, as indicated in Figs. 1, 2, 8 and 9 has a main body or support portion 116 in which plungers 11, 12 and 13 associated with the yarn carrier bars 1, 2 and 3, respectively, are longitudinally slidably supported for movement at right angles to the carrier bars.

Figure 8:
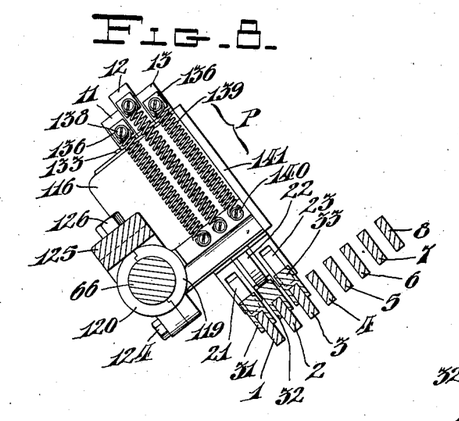
Fig. 8 is a sectional view taken substantially along the line 8—8 of Fig. 4.

As seen in Fig. 8, the body 116 has a half sleeve portion 119 cooperating with a half sleeve member 120, secured thereto by screws 124 to provide a full sleeve about the friction rod 66 whereby the body has sliding fit on the rod. The friction box housing 109 and the body 116 of the device P are connected to each other by a bridge member 125 and screws 126.

Figure 9:
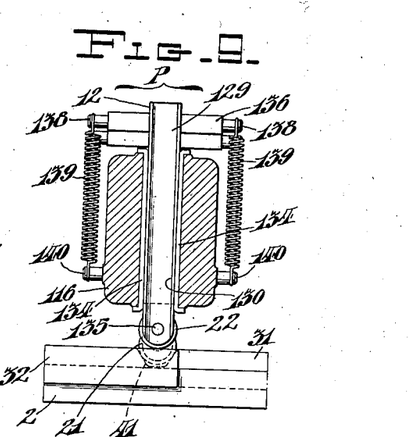
Fig. 9 is a sectional view taken substantially along the line 9—9 of Fig. 2.

As indicated in Fig. 9, each plunger, like the plunger 12, is of elongated flat strap character having a depressed side face 129 and edge flanges 130 rendering the plunger of substantially I-beam character. This structure reduces frictional contact on the broad side faces with a bearing liner 133 in the body 116 and the plate 141, and on the narrow edge faces with liners 134. Rollers 21, 22 and 23 are journaled in the lower ends of the plungers 11, 12 and 13, respectively by pins 135.

Cross beams 136 at the upper ends of the plungers 11, 12 and 13 have end pins 138 through which the plungers are connected by tension springs 139 to pins 140 at the lower portion of the body 116 whereby to force the plungers downwardly. A plate 141, Fig. 4, is secured to the body 116, as by screws 142.

The carrier bars 1, 2 and 3 are provided with top edge liners 31, 32 and 33, respectively, of inverted substantially U-shape in cross section fitted downwardly over the bars and secured thereto as by rivets 144. The liners 31, 32 and 33, see Figs. 14—19, are respectively constructed in longitudinal sections divided at points 145 opposite notches 41, 42 and 43 each having the shape in side elevation of the cross section of an inverted frustum into which the rollers are forced by the springs 139 to bear against the sloping sides slightly clear of the bottom surfaces of the notches.

The end selector mechanisms L and R are similar in construction and operation except as modified by their right and left hand relation, and, as better seen in Figs. 4, 10, 11, 12 and 13, each comprises a body 147 secured by screws 148 to a bracket 149 that is fixed to the adjacent carrier nut 34 by screws 150.

Plungers 51, 52 and 53 in the mechanism L and plungers 61, 62 and 63 of the mechanism R, see Figs. 14–19, are vertically slidably mounted in the body 147 and held therein, as by plates 151, the upper plate of which is held to the body by screws 152 and the lower plate of which is held by the screws 148 and other of the screws 152. The plungers are biased downwardly, or toward the carrier bars, as by tension springs 153 connected between pins 154 on the reciprocable plungers and hook-like projections 155 on the plate 151.

Each plunger 51, 52, 53, 61, 62 and 63 has a lower end for direct cooperation with its corresponding carrier bar 1, 2 or 3; the plungers 51, 52 and 53 of the mechanism L cooperating with dogs 71, 72 and 73 and the plungers 61, 62 and 63 of the mechanism R cooperating with dogs 81, 82 and 83 having cam faces and plunger stop cooperating shoulders, and carried by the carrier bars 1, 2 and 3, respectively.

Each plunger 51, 52 and 53 also carries a portion for cooperation with another carrier; the plunger 51 having a cam follower portion 93 for cooperation with a sloping cam face of the dog 73, the plunger 52 having a cam follower portion 91 for cooperation with a similar sloping cam face of the dog 71, and the plunger 53 having a cam follower portion 92 for cooperation with a sloping cam face of the dog 72.

Similarly, the plunger 61 has a cam follower portion 103 for cooperation with a sloping cam surface of the dog 83, the plunger 62 has a cam follower portion 101 for cooperation with a sloping cam surface of the dog 81, and the plunger 63 has a cam follower portion 102 for cooperation with a sloping cam surface of the dog 82.

Figures 10, 11, 12, 13:
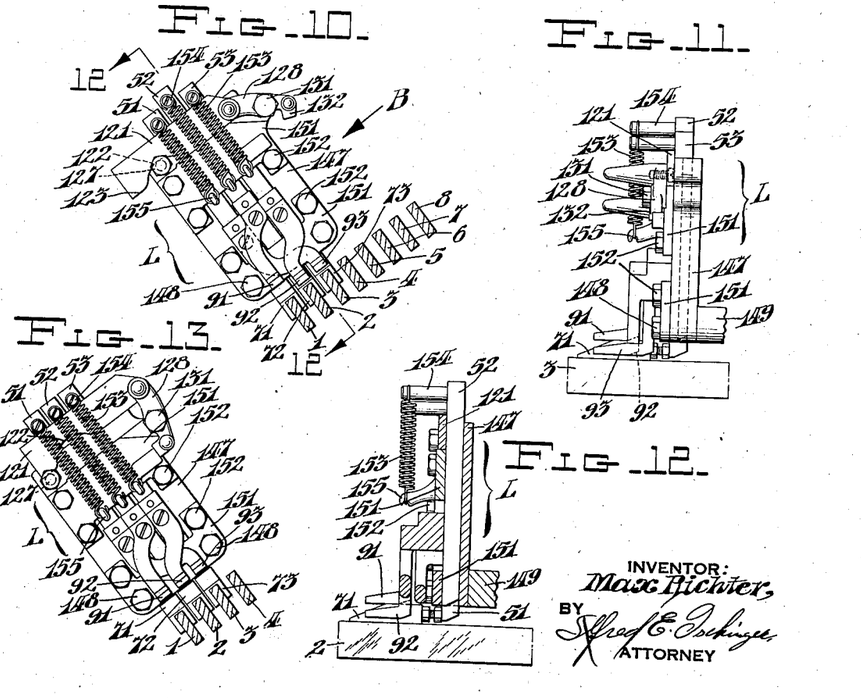
Fig. 10 is an enlarged sectional view taken substantially along the line 10—10 of Fig. 4.
Fig. 11 is a view taken in the direction of the arrow B of Fig. 10.
Fig. 12 is a sectional view taken substantially along the line 12—12 of Fig. 10.
Fig. 13 is a view similar to Fig. 10, showing the parts in different positions.

The plungers may be raised to an inoperative position as by a member 121 which cooperates with the pins 154 of the plungers 51, 52 and 53, see Figs. 10 and 13. The plungers 61, 62 and 63 are similarly raised. The member 121 is provided with high and low surfaces 122 and 123 for engagement with a stud 127 secured to the bracket 147. The member 121 is connected to one end of a lever 128 which is pivoted at 131 to the bracket 147, the other end of lever 128 having an extension 132 for engagement with a fixed part of the bracket 147.

By turning the lever 128 in a clockwise direction so that the extension 132 is moved into engagement with the bracket 147, the member 121 is moved from the position of Fig. 10, in which the low surface of member 121 is in engagement with the stud 127, to the position of Fig. 13, in which the high surface is in engagement with the stud, raising the plungers to an inoperative position.

Referring to Figs. 1, 4, 6 and 7, carrier bar rebound stop devices LS and RS, associated with the selector mechanisms L and R, respectively, each comprises a body portion 156 on the adjacent bracket 149 that is adapted to support plungers 157 for cooperation with contact screws 158 on dogs 159 that are fixed to the carrier bars, the plungers being held to the body portion 156, as by a member 160. Tension springs 162 are connected between pins 163 and 164 on the plungers 157 and the members 160, respectively, for biasing the plungers toward the carrier bars into the path of movement of the contact screws 158 on the carrier bars.

Figure 7:
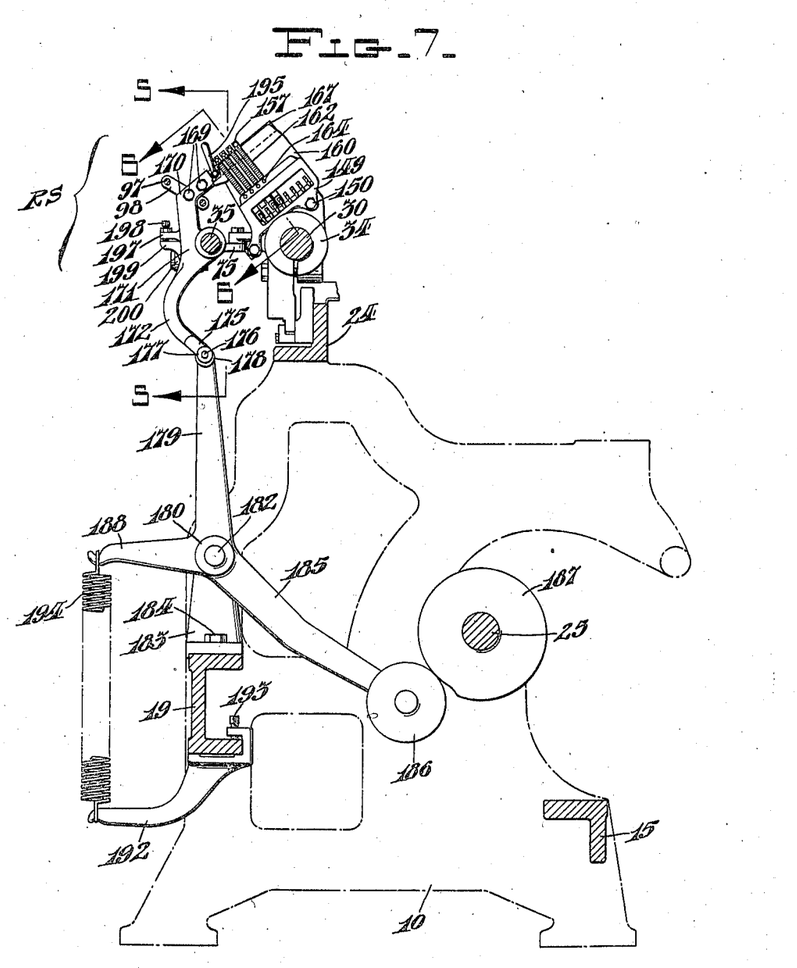
Fig. 7 is a sectional view taken along the line 7—7 of Fig. 1.

A blade 167, operating in a groove 168 in the member 160 under the pins 163 to raise and lower the plungers 157, is secured, as by screws 169, Figs. 5 and 7, to one arm 170 of a lever 171 that is pivotally journaled on the guide rod 35 and has another arm 172 having a fork like portion 175 carrying a rod 176 fixed to the rod as by collar and set screw devices 177. The arm 170 operates between the short bars 97, or in a position such that, if it did not operate in this position, the rods 90 and 100 could be in one piece. Each rebound stop device LS and RS, being secured to the adjacent end stop carrier nut 34, causes the rod 176, when the nut 34 is adjusted during narrowing, to slide through one end 178 of one arm 179 of a lever 180 that is pivotally mounted by a shaft 182 to a bracket 183 that is fixed, as by screws 184, to the back beam 19. The lever 180 has a second arm 185 carrying a roller follower 186 for cooperation with a cam 187 on the cam shaft 25, and a third arm 188 between which and a bracket 192 secured to the back beam 19, as by a set screw 193, a tension spring 194 extends to bias the lever 180 counterclockwise about the axis of the shaft 182, as viewed in Fig. 7, and to press the follower 186 against the cam 187. A hand lever 195 pivotally mounted on the blade 167 near the lever arm 170 of the lever 171, has a cam portion at its front end for operation against a portion of the member 160. In the position of the hand lever 195 of Fig. 7, the lever 171 and the blade 167 are free to operate, but, by turning the handle 195 counterclockwise, as viewed in this figure, the blade 167 may be lifted against the action of the springs 162 and locked in inactive position to lift the plungers 157 and lock them in inactive position relative to the carrier bars.

The lever 171 has a side lug 197 in which is disposed a screw 198 for contact with one arm 199 of a lever 200 that is pivotally mounted by a shaft 202 on the bracket 74 of the end stop carrier nut 34. The lever 200, at one end of the machine, has another arm 203 for engagement, once with each revolution of the cam shaft 25, with the corresponding rod 100 to impart a short lengthwise movement, through the rods 97, to the rod 90. This movement is transmitted as a short impulse to the friction box 70 at the moment of reversal of the friction rod whereby to avoid slippage of the box by its inertia relative to the friction box. Similarly, the lever 200, at the other end of the machine, has an arm 203 for engagement with the corresponding rod 100 to impart a like movement, in the opposite direction, through the adjacent rods 97, to the rod 89. The rods 100, at the respective ends of the machine, are returned to original positions by engagement of the lever 104, on the friction box 70, with the blocks 94 and 95 on the rods 89 and 90, respectively, at opposite ends of its strokes.

OPERATION

In the following description of one cycle of the operation of the yarn carrier mechanism, in which the conditions existing during each coulier stroke of the three carrier operation are set forth, since these conditions are similar during all the strokes, the descriptions of the several strokes throughout a full three carrier cycle are similar except for the transposition of like parts indicated by their reference characters.

*Stroke of carrier bar 3 to the right*

Figures 14, 15:
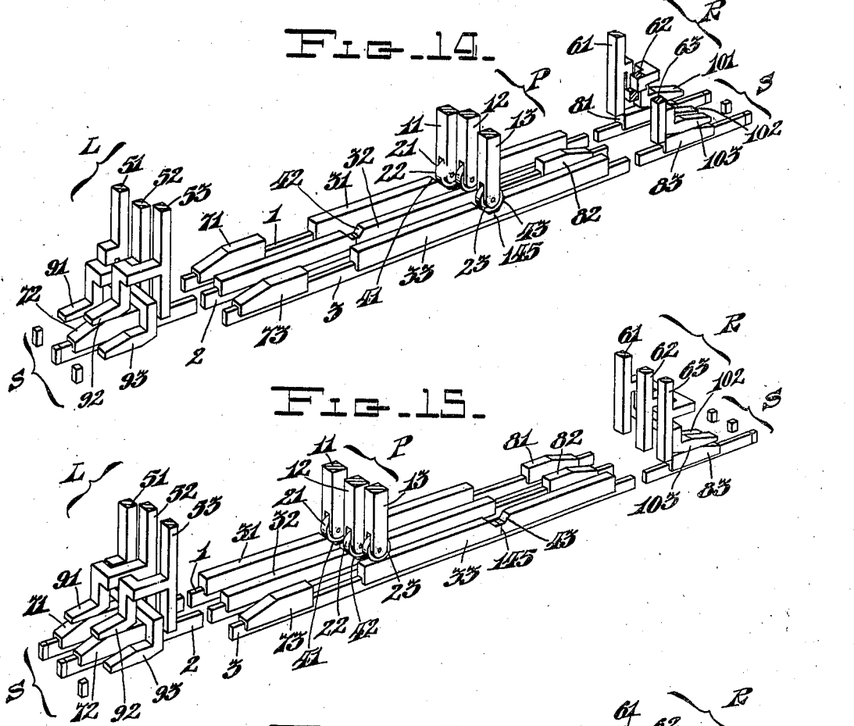
Figs. 14, 15, 16, 17, 18 and 19 are diagrammatic views of yarn carrier bars and locally associated cooperating elements as related in successive stages of one cycle of operation.

Referring to Figs. 14 to 19, inclusive, as indicated in Fig. 14, the carrier bar 3 has just completed a stroke to the right against end stop S, to which it has been driven by the device P having the roller 23 of the plunger 13 in the notch 43. At the end of the stroke, the roller 23 remains in the notch 43, the friction box 70 being stopped by the block 95. Also, during the above mentioned stroke of the carrier bar 3 to the right, the roller 22 is moved out of its notch 42 to roll idly along the top edge liner 32 of its bar 2, and the roller 21 is moved idly along the liner 31 of its bar 1 to position in its notch 41 at the end of the stroke.

When the bar 3 completes its above mentioned stroke to the right, its dog 83 raises the plunger 63 which drops to position to hold the dog 83 after it passes the plunger 63 and engages the follower 103 to raise the plunger 61 out of the path of the dog 81 on the carrier bar 1. The latter, thus released for movement to the left, when the coulier motion reverses to so move the bar 1, the rebound stop device RS is actuated to release position, and the bar 1 is moved to the left by the roller 21 in the notch 41 to the position of Fig. 15. During this action, the bar 3 is held at the right hand end of its stroke by the lower end of the plunger 63 against the left hand end of the dog 83, and (see Fig. 4) by the associated plunger 157 of the rebound stop device RS.

*Stroke of carrier bar 1 to the left*

Movement of the bar 1 to the left against an end stop S is effected by the device P having the roller 21 of the plunger 11 in the notch 41. At the end of the stroke, the roller 21 remains in the notch 41, the friction box 70 being stopped by the block 94. Also, during the stroke of the carrier bar 1 to the left, the roller 23 is moved out of its notch 43 to roll along the edge liner 33 of its bar 3, and the roller 22 is moved idly along its bar 2 to position in its notch 42 at the end of the stroke.

When the bar 1 completes its stroke to the left, its dog 71 raises the plunger 51 which drops to position to hold the dog 71 after it passes the plunger 51, and engages the follower 91 to raise the plunger 52 out of the path of the dog 72 on the carrier 2. The latter thus released for movement to the right, when the coulier motion reverses to so move the bar 2, the rebound stop device LS rises and the bar 2 is moved to the right by the roller 22 in the notch 42 to the position of Fig. 16. During this action the bar 1 is held at the left end of its stroke by the lower end of the plunger 51 against the right hand end of the dog 71 and by the associated plunger 157 of the rebound stop device LS.

*Stroke of carrier bar 2 to the right*

Movement of the bar 2 to the right against an end stop S is effected by the device P having the roller 22 of the plunger 12 in the notch 42. At the end of the stroke, the roller 22 remains in the notch 42, the friction box 70 being stopped by the block 95. Also, during the stroke of the carrier bar 2 to the right, the roller 21 is moved out of its notch 41 to roll along the edge liner 31 of its bar 1, and the roller 23 is moved idly along its bar 3 to position in its notch 43 at the end of the stroke.

When the bar 2 completes its stroke to the right, its dog 82 raises the plunger 62 which drops to position to hold the dog 82 after it passes the plunger 62, and engages the follower 102 to raise the plunger 63 out of the path of the dog 83 on the carrier 3. The latter thus released for movement to the left, when the coulier motion reverses to so move the bar 3, the rebound stop device RS rises and the bar 3 is moved to the left by the roller 23 in the notch 43 to the position of Fig. 17. During this action, the bar 2 is held at the right end of its stroke by the lower end of the plunger 62 against the left hand end of the dog 82 and by the associated plunger 157 of the rebound stop device RS.

*Stroke of carrier bar 3 to the left*

Movement of the bar 3 to the left against an end stop S is effected by the device P having the roller 23 of the plunger 13 in the notch 43. At the end of the stroke, the roller 23 remains in the notch 43, the friction box 70 being stopped by the block 94. Also, during the stroke of the carrier bar 3 to the left, the roller 22 is moved out of its notch 42 to roll along the edge liner 32 of its bar 2, and the roller 21 is moved idly along its bar 1 to position in its notch 41 at the end of the stroke.

When the bar 3 completes its stroke to the left, its dog 73 raises the plunger 53 which drops to position to hold the dog 73 after it passes the plunger 53, and engages the follower 93 to raise the plunger 51 out of the path of the dog 71 on the carrier 1. The latter thus released for movement to the right, when the coulier motion reverses to so move the bar 1, the rebound stop device LS rises and the bar 1 is moved to the right by the roller 21 in the notch 41 to the position of Fig. 18. During this action, the bar 3 is held at the left end of its stroke by the lower end of the plunger 53 against the right hand end of the dog 73 and by the associated plunger 157 of the rebound stop device LS.

*Stroke of carrier bar 2 to the left*

Movement of the bar 2 to the left against an end stop S is effected by the device P having roller 22 of the plunger 12 in the notch 42. At the end of the stroke, the roller 22 remains in the notch 42, the friction box 70 being stopped by the block 94. Also, during the stroke of the carrier bar 2 to the left, the roller 21 is moved out of the notch 41 to roll along the edge liner 31 of its bar 1, and the roller 23 is moved idly along its bar 3 to position in its notch 43 at the end of the stroke. When the bar 2 completes its stroke to the left, its dog 72 raises the plunger 52 which drops to position to hold the dog 72 after it passes the plunger 52, and engages the follower 92 to raise the plunger 53 out of the path of the dog 73 on the carrier bar 3. The latter thus released for movement to the right, as set forth in the first written section of operation hereinabove set forth, when the coulier motion reverses to so move the bar 3, the rebound stop device LS raises and the bar 3 is moved to the right by the roller 23 in the notch 43 to the position of Fig. 14. During this action, the bar 2 is held at the left end of its stroke by the lower end of the plunger 52 against the right hand end of the dog 72 and by the associated plunger 157 of the rebound stop device LS.

*Stroke of carrier bar 1 to the right*

Movement of the bar 1 to the right against an end stop S is effected by the device P having the roller 21 of the plunger 11 in the notch 41. At the end of the stroke, the roller 21 remains in the notch 41, the friction box 70 being stopped by the block 95. Also, during the stroke of the carrier bar 1 to the right, the roller 23 is moved out of its notch 43 to roll along the edge liner 33 of its bar 3, and the roller 22 is moved idly along its bar 2 to position in its notch 42 at the end of the stroke.

When the bar 1 completes its stroke to the right, its dog 81 raises the plunger 61 which drops to position to hold the dog 81 after it passes the plunger 61, and engages the follower 101 to raise the plunger 62 out of the path of the dog 82 on the carrier bar 2. The latter thus released for movement to the left, when the coulier motion reverses to so move the bar 2, the rebound stop device RS rises and the bar is moved to the left by the roller 22 in the notch 42 to the position of Fig. 19. During this action, the bar 1 is held at the right end of its stroke by the lower end of the plunger 61 against the left hand end of the dog 71 and by the associated plunger 157 of the rebound stop device RS.

Figure 16:
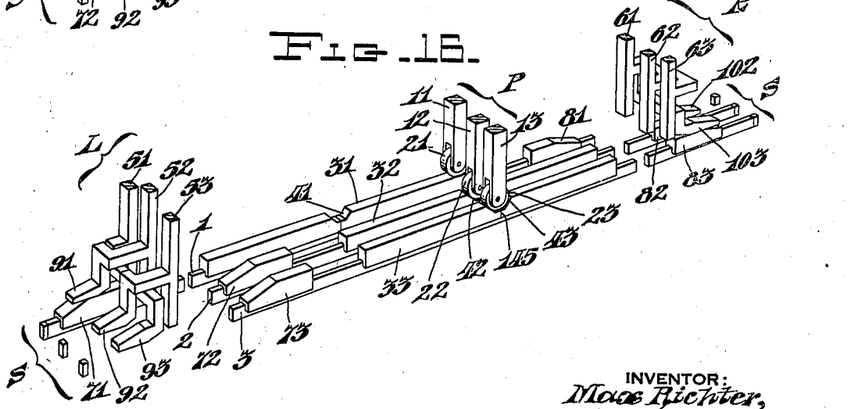
Figure 17:
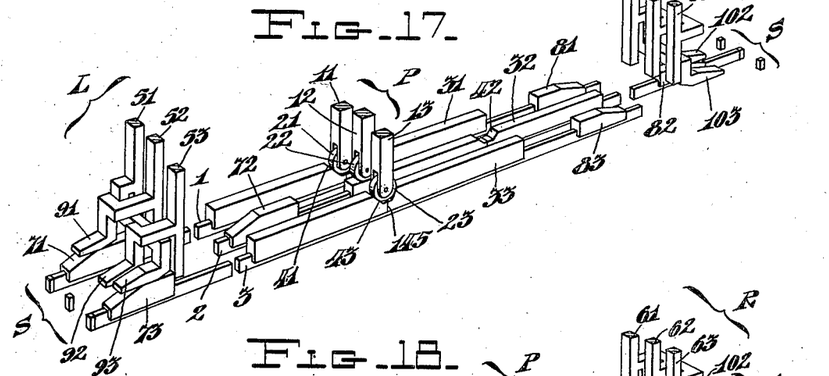
Figure 18:
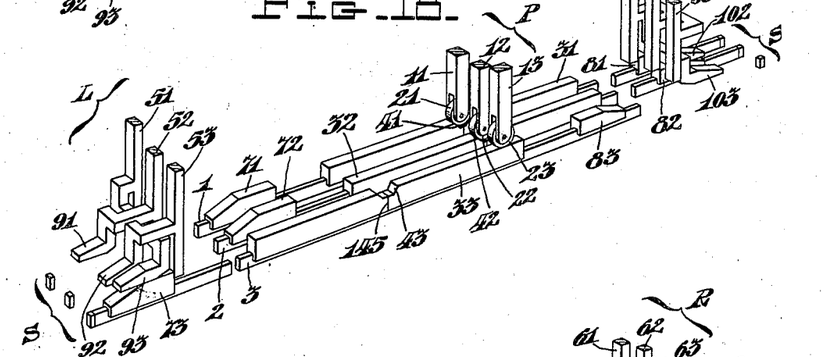
Figure 19:
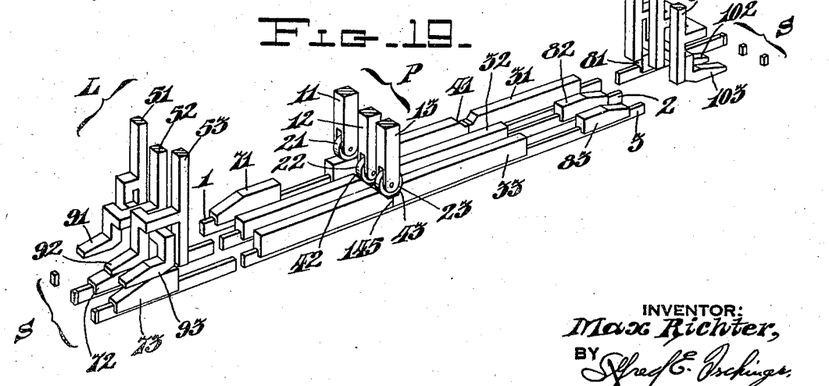

The above-described movements of the carrier bars 1, 2 and 3 carry them through a complete cycle of movement of carrier bar 3 from left to right to its position of Fig. 14, the carrier bar 1 to the left from the position of Fig. 14 to the position of Fig. 15, the movement of carrier bar 2 to the right from the position of Fig. 15 to the position of Fig. 16, the movement of the carrier bar 3 to the left from its position of Fig. 16 to the position of Fig. 17, the movement of the carrier bar 1 to the right from its position of Fig. 17 to its position of Fig. 18, and the movement of the bar 2 to the left from its position of Fig. 18 to its position of Fig. 19. The next movement therefore is the movement of carrier bar 3 to the right from its position of Fig. 19 to its position of Fig. 14 to start a new cycle of the order set forth which is repeated throughout the knitting with the carriers 1, 2 and 3.

The term "carrier" herein is intended to mean any member or element, such as a carrier bar, a yarn guide finger on the bar and equivalents of these and other elements, which mediately or intermediately carry the yarn for laying it to the needles.

Of course, the improvements specifically shown and described by which I obtain the above results, can be changed and modified in various ways without departing from the invention herein disclosed and hereinafter claimed.

I claim:

1. In a knitting machine, a reciprocable driver member, yarn carriers to be driven by said member, means having first yieldable connection to the driver and including elements providing second yieldable connection individually between said means and the carriers, means including an element on each carrier cooperating with one of said first elements for drive of the corresponding carrier by the driver through both said first and second yieldable connections, and means for selectively holding and releasing the carriers relative to the driver for preventing drive of a carrier and causing yield of said second connection thereof to the driver when held by the holding means and providing when the carrier is released for drive by the driver through both the first and second yieldable connection to a position at which the first yieldable connection yields and the second yieldable connection remains connected to the carrier.

2. In a knitting machine, a reciprocable driver member, yarn carriers to be driven by said member, means having first yieldable connection to the driver and including elements providing second yieldable connection individually between said means and the carriers, means including an element on each carrier cooperating with one of said first elements for drive of the corresponding carrier by the driver through both said first and second yieldable connections, and carrier controlled means for selectively holding and releasing the carriers relative to the driver for preventing drive of a carrier and causing yield of said second connection thereof to the driver when held by the holding means and providing when the carrier is released for drive by the driver through both the first and second yieldable connection to a position at which the first yieldable connection yields and the second yieldable connection remains connected to the carrier.

3. In a knitting machine, a reciprocable driver member, yarn carriers to be driven by said member, means having first yieldable connection to the driver and including elements providing second yieldable connection individually between said means and certain of the carriers, means including an element on each of said certain carriers cooperating with one of said first elements providing for drive of the corresponding carrier by the driver through both said first and second yieldable connections, and carrier-operated means for selectively holding and releasing said certain carriers relative to the driver in repeated cycles of predetermined sequence for preventing drive of each of said certain carriers and causing yield of the connection thereof to the driver when held by the holding means and providing when the carrier is released for drive by the driver through both the first and second yieldable connections to a position at which the first yieldable connection yields and the second yieldable connection remains connected to the carrier.

4. In a knitting machine, a reciprocable driver member, yarn carriers to be driven by said member, means having first yieldable connection to the driver and including elements providing second yieldable connection individually between said means and three of the carriers, means including an element on each of the three carriers cooperating with one of said first elements providing for drive of the corresponding carrier by the driver through both said first and second yieldable connections, and carrier-operated means for selectively holding and releasing the three carriers relative to the driver in repeated cycles of predetermined sequence for preventing drive of each of the three carriers and causing yield of the connection thereof to the driver when held by the holding means and providing when the carrier is released for drive by the driver through both the first and second yieldable connections to a position at which the first yieldable connection yields and the second yieldable connection remains connected to the carrier.

5. In a knitting machine, a reciprocable driver member, yarn carriers to be driven by said member, means having first yieldable connection to the driver and including elements providing second yieldable connection individually between said means and certain of the carriers, means including an element on each of said certain carriers cooperating with one of said first elements providing for drive of the corresponding carrier by the driver through both said first and second yieldable connections, and carrier-operated means for selectively holding and releasing said certain carriers relative to the driver in repeated cycles of predetermined sequence for preventing drive of each of said certain carriers and causing yield of the connection thereof to the driver when held by the holding means and providing when the carrier is released for drive by the driver through both the first and second yieldable connections to a position at which the first yieldable connection yields and the second yieldable connection remains connected to the carrier, said carrier operated means including a movably mounted latch associated with each of said certain carriers, each latch having means for direct locking engagement with one of said certain carriers and means operatively related thereto for engagement with another of said certain carriers, and means on said certain carriers disposed to act upon said operatively related means for moving the related latch out of locking engagement with its associated carrier.

6. In a knitting machine, a reciprocable driver member, yarn carriers to be driven by said member, means having first yieldable connection to the driver and including elements providing second yieldable connection individually between said means and three of the carriers, means including an element on each of said three carriers cooperating with one of said first elements providing for drive of the corresponding carrier by the driver through both said first and second yieldable connections, and carrier-operated means for selectively holding and releasing said three carriers relative to the driver in repeated cycles of predetermined sequence for preventing drive of each of said three carriers and causing yield of the connection thereof to the driver when held by the holding means and providing when the carrier is released for drive by the driver through both the first and second yieldable connections to a position at which the first yieldable connection yields and the second yieldable connection remains connected to the carrier, said carrier operated means including a movably mounted latch associated with each of said three carriers, each latch having means for direct locking engagement with one of said three carriers and means operatively related thereto for engagement with another of the three carriers, and means on said three carriers disposed to act upon said operatively related means for moving the related latch out of locking engagement with its associated carrier.

7. In a knitting machine, a reciprocable driver member, yarn carrier bars to be driven by said member, means including structure carried by, and having first yieldable connection to, the driver and elements carried by said structure providing second yieldable connection individually between the structure and the carrier bars, there being only one such yieldable connection between each carrier bar and said structure, means including an element on each carrier bar intermediate the ends thereof cooperating with one of said first elements providing for drive of the corresponding carrier bar by the driver through both said first and second yieldable connections, and means for selectively holding and releasing the carrier bars relative to the driver for preventing drive of a carrier bar and causing yield of the second yieldable connection thereof to said structure when held by the holding means and providing when the carrier bar is released for drive by the drive through both the first and second yieldable connections to a position at which the first yieldable connection yields and the second yieldable connection remains connected to the carrier bar.

8. In a knitting machine, a reciprocable driver member, a yarn carrier to be driven by said member, means having first yieldable connection to the driver and including an element providing second yieldable connection between said means and the carrier, means including an element on the carrier cooperating with said first element for drive of the carrier through both said yieldable connections, and means for holding and releasing the carrier relative to the driver for preventing drive of the carrier and causing yield of said second connection thereof to the driver when held by the holding means and providing when the carrier is released for drive by the driver through both said yieldable connections to a position at which the first yieldable connection yields and the second yieldable connection remains connected to the carrier.

9. In a knitting machine, a reciprocable driver member, a yarn carrier to be driven by said member, means including a structure carried by, and having first yieldable connection to, the driver and an element carried by said structure providing second yieldable connection between said structure and the carrier, there being only one such yieldable connection between the carrier and said structure, an element on the carrier cooperating with said first element providing for drive of the carrier by the driver through both said first and second yieldable connections, and means for holding and releasing the carrier relative to the driver for preventing drive of the carrier and causing yield of the second connection thereof to said structure when held by the holding means and providing when the carrier is released for drive by the driver through both the first and second yieldable connections to a position at which the first yieldable connection yields and the second yieldable connection remains connected to the carrier.

10. In a knitting machine, a reciprocable driver member, a yarn carrier bar to be driven by said member, means including a structure carried by, and having first yieldable connection to, the driver and an element carried by said structure providing second yieldable connection between said structure and the carrier bar, means including an element on the carrier bar intermediate the ends thereof cooperating with said first element providing for drive of the carrier bar by the driver through both said first and second yieldable connections, and means for holding and releasing the carrier bar relative to the driver for preventing drive of the carrier bar and causing yield of the second connection thereof to said structure when held by the holding means and providing when the carrier bar is released for drive by the driver through both the first and second yieldable connections to a position at which the first yieldable connection yields and the second yieldable connection remains connected to the carrier bar.

11. In a knitting machine, a reciprocable driver member, yarn carriers to be driven by said member, means having first yieldable connection to the driver and including elements at fixed positions relative thereto in the direction of reciprocation thereof providing second yieldable connection individually between said means and the carriers, means including an element on each carrier cooperating with one of said first elements providing for drive of the corresponding carrier by the driver through both said first and second yieldable connections, and carrier-operated means for selectively holding and releasing the carriers relative to the driver for preventing drive of a carrier and causing yield of the connection thereof to the driver when held by the holding means and providing when the carrier is released for drive by the driver through both the first and second yieldable connections to a position at which the first yieldable connection yields and the second yieldable connection remains connected to the carrier.

12. In a knitting machine, a reciprocable driver member, yarn carriers to be driven by said member, means having first yieldable connection to the driver and including elements at fixed positions relative thereto in the direction of reciprocation thereof providing second yieldable connection individually between said means and the carriers, there being only one such yieldable connection between each carrier and the driver, means including an element on each carrier cooperating with one of said first elements providing for drive of the corresponding carrier by the driver through both said first and second yieldable connections, and means for selectively holding and releasing the carriers relative to the driver for preventing drive of a carrier and causing yield of the connection thereof to the driver when held by the holding means and providing when the carrier is released for drive by the driver through both the first and second yieldable connections to a position at which the first yieldable connection yields and the second yieldable connection remains connected to the carrier.

13. In a knitting machine, a reciprocable driver member, yarn carriers to be driven by said member, means having first yieldable connection to the driver and including elements providing second yieldable connection individually between said means and the carriers, an element on each carrier cooperating with one of said first elements for drive of the corresponding carrier by the driver through both said yieldable connections, means for selectively holding and releasing the carriers relative to the driver for preventing drive of a carrier and causing yield of said second connection thereof to the driver when held by the holding means and providing when the carrier is released for drive by the driver through both said yieldable connections to a position at which the first yieldable connection yields and the second yieldable connection remains connected to the carrier, and shock-distributing means for substantially simultaneously engaging portions on said first means and the carrier selected for actuation, respectively, at said position.

14. In a knitting machine, a reciprocable driver member, yarn carriers to be driven by said member, a narrowing carriage, stops for the yarn carriers mounted on the narrowing carriage, means having first yieldable connection to the driver and including elements providing second yieldable connection individually between said means and the yarn carriers, an element on each yarn carrier cooperating with one of said first elements for drive of the corresponding yarn carrier by the driver through both said yieldable connections, means for selectively holding and releasing the carriers relative to the driver for preventing drive of a carrier and causing yield of said second connection thereof to the driver when held by the holding means and providing when the carrier is released for said drive by the driver through both said yieldable connections to a position determined by corresponding of said stops at which the first yieldable connection yields and the second yieldable connection remains connected to the carrier, and shock-distributing means carried by the narrowing carriage for stopping said first means substantially in unison with stopping of the carriers of said stops.

15. In a knitting machine, a reciprocable driver member, a yarn carrier to be driven by said member, means having first yieldable connection to the driver and including an element providing second yieldable connection between said means and the carrier, an element on the carrier cooperating with said first element for drive of the carrier by the driver through both said yieldable connections, means for holding and releasing the carrier relative to the driver for preventing drive of the carrier and causing yield of said second connection thereof to the driver when held by the holding means and providing when the carrier is released for drive by the driver through both said yieldable connections to a position at which the first yieldable connection yields and the second yieldable connection remains connected to the carrier, and shock-distributing means for substantially simultaneously engaging portions on said first means and the carrier, respectively, at said position.

16. In a knitting machine, a reciprocable driver member, a yarn carrier to be driven by said member, a narrowing carriage, stops for the carrier mounted on the carriage, means having first yieldable connection to the driver and including an element providing second yieldable connection between said means and the carrier, an element on the carrier cooperating with said first element for drive of the carrier by the driver through both said yieldable connections, means for holding and releasing the carrier relative to the driver for preventing drive of the carrier and causing yield of said second connection thereof to the driver when held by the holding means and providing when the carrier is released for drive by the driver through both said yieldable connections to a position determined by said stops at which the second yieldable connection remains connected to the carrier, and shock-distributing means carried by the narrowing carriage for stopping said first means substantially in unison with stopping of the carrier by said stops.

17. In a knitting machine, a reciprocable member, a driver member yieldably connected thereto, a yarn carrier to be driven by said reciprocable member through said driver member, means for holding the carrier against, and releasing it for, driving by the driver member, and means operating entirely by, and between, the driver and the carrier for driving the carrier by the driver in each direction of reciprocation and adapted to release the driver from the carrier solely by the pull of the driver member when the carrier is held by said holding means.

18. In a knitting machine, a reciprocable member, a driver member yieldably connected thereto, a yarn carrier to be driven by said reciprocable member through said driver member, means for holding the carrier against, and releasing it for, driving by the driver member, and means operated entirely by, and between, the driver and the carrier at a single position therebetween for driving the carrier by the driver in each direction of reciprocation and adapted to release the driver from the carrier solely by the pull of the driver member when the carrier is held by said holding means.

19. In a knitting machine, a reciprocable member, a driver member yieldably connected thereto, a yarn carrier bar to be driven by said reciprocable member through said driver member, means for holding the carrier against, and releasing it for, driving by the driver member, and means operated entirely by, and between, the driver and the carrier bar at a position between the ends of the bar for driving the bar by the driver in each direction of reciprocation and adapted to release the driver from the carrier solely by the pull of the driver member when the carrier is held by said holding means.

20. In a knitting machine, a reciprocable member, a driver member yieldably connected thereto, a yarn carrier to be driven by said reciprocable member through said driver member, means for holding the carrier against, and releasing it for, driving by the driver member, and antifriction means operating entirely by, and between, the driver and the carrier for driving the carrier by the driver in each direction of reciprocation and adapted to release the driver from the carrier solely by the pull of the driver member when the carrier is held by said holding means.

21. In a knitting machine, a reciprocable member, a driver member yieldably connected thereto, a yarn carrier bar to be driven by said reciprocable member through said driver member, means for holding the carrier against, and releasing it for, driving by the driver member, and means including an element spring biased laterally to the bar between the bar and the driver for driving the carrier by the driver in each direction of reciprocation and adapted to release the driver from the carrier solely by the pull of the driver member when the carrier is held by said holding means.

22. In a knitting machine, a reciprocable driver member, a yarn carrier bar to be driven by said member, means for holding and releasing the bar, a spring biased plunger carried by the driver and acting laterally toward the bar, and a roller on the plunger for cooperation with an element on the bar for driving the bar by the driver when the bar is released and for travel along the bar when the bar is held.

23. In a knitting machine, a reciprocable driver member, a plurality of yarn carrier bars to be driven by said member, a plurality of spring biased plungers carried by the driver each acting laterally toward one of the bars, an element on each plunger for cooperation with an element intermediate the ends of its associated carrier bar for driving the bar by the driver when the bar is released and slip releasable from the bar therealong for travel along the bar when the bar is held, and means operated by the bars including a movably mounted latch associated with each of the bars, each latch having means for direct locking engagement with one of the bars and means operatively related thereto for engagement with another bar, and means on the bars disposed to act upon said operatively related means for moving the related latch out of locking engagement with its associated bar.

24. In a knitting machine, a reciprocable member, a driver member yieldably connected thereto, a yarn carrier to be driven by said reciprocable member through said driver member, means operating entirely by, and between, the driver and the carrier for driving the carrier by the driver in each direction of reciprocation and adapted to release the driver from the carrier solely by the pull of the driver member when the carrier is held, and carrier holding and releasing means operative at the ends of each carrier stroke.

25. In a knitting machine, a reciprocable driver member, yarn carriers to be driven by said member, means having first yieldable connection to the driver and including elements providing second yieldable connection individually between said means and the carriers, means including an element on each carrier cooperating with one of said first elements providing for drive of the corresponding carrier by the driver through both said first and second yieldable connections, carrier operated means for selectively holding and releasing the carriers relative to the driver for preventing drive of a carrier and causing yield of the second connection thereof to the driver when held by the holding means and providing when the carrier is released for said drive by the driver through both the first and second yieldable connections to a position at which the first yieldable connection yields and the second yieldable connection remains connected to the carrier, and carrier holding and releasing means operative at the ends of each carrier stroke.

26. In a knitting machine, a reciprocable driver member, yarn carriers to be driven thereby, means having first yieldable connection to the driver and including elements providing second yieldable connection individually between said means and the carriers, means including an element on each carrier cooperating with one of said first elements for drive of the corresponding carrier by the driver through both said first and second yieldable connections, means for selectively holding and releasing the carriers relative to the driver for preventing drive of a carrier and causing yield of said second connection thereof to the driver when held by the holding means and providing when the carrier is released for said drive by the driver through both the first and second yieldable connection to a position at which the first yieldable connection yields and the second yieldable connection remains connected to the carrier, and carrier holding and releasing means operative at the ends of each carrier stroke.

27. In a knitting machine, a reciprocable driver member, yarn carriers to be driven by said member, means having first yieldable connection to the driver and including elements at fixed positions relative thereto in the direction of reciprocation thereof providing second yieldable connection individually between said means and the carriers, means including an element on each carrier cooperating with one of said first elements providing for drive of the corresponding carrier by the driver through both said first and second yieldable connections, carrier-operated means for selectively holding and releasing the carriers relative to the driver for preventing drive of a carrier and causing yield of the connection thereof to the driver when held by the holding means and providing when the carrier is released for said drive by the driver through both the first and second yieldable connections to a position at which the first connection yields and the second yieldable connection remains connected to the carrier, and carrier holding and releasing means operative at the ends of each carrier stroke.

28. In a knitting machine, a reciprocable driver member, yarn carriers to be driven by said member, means having first yieldable connection to the driver and including elements providing second yieldable connection individually between said means and certain of the carriers, means including an element on each of said certain carriers cooperating with one of said first elements providing for drive of the corresponding carrier by the driver through both said first and second yieldable connections, and carrier-operated means for selectively holding and releasing said certain carriers relative to the driver in repeated cycles of predetermined sequence for preventing drive of each of said certain carriers and causing yield of the connection thereof to the driver when held by the holding means and providing when the carrier is released for said drive by the driver through both the first and second yieldable connections to a position at which the first connection yields and the second connection remains connected to the carrier, and carrier holding and releasing means operative at the ends of each carrier stroke.

29. In a knitting machine, a reciprocable driver element, yarn carrier elements to be driven by said driver element, means having first yieldable connection to the driver and including portions providing second yieldable connection individually between said means and the carrier elements, means including a portion on each carrier cooperating with one of said first portions providing for drive of the corresponding carrier element by the driver element through both said first and second yieldable connections, carrier element operated means for selectively holding and releasing the carrier elements relative to the driver element for preventing drive of a carrier element and causing yield of the connection thereof to the driver element when held by the holding means and providing when the carrier is released for said drive by the driver element through both the first and second yieldable connections to a position at which the first connection yields and the second connection remains connected to the carrier element, and means for imposing an impulse on one of said elements in addition to its reciprocable impulse at the beginning of each stroke in each direction.

30. In a knitting machine, a reciprocable driver member, yarn carriers to be driven by said member, means having first yieldable connection to the driver and including portions providing second yieldable connection individually between said means and the carriers, means including a portion on each carrier cooperating with one of said first portions providing for drive of the corresponding carrier by the driver through both said first and second yieldable connections, carrier operated means for selectively holding and releasing the carriers relative to the driver for preventing drive of a carrier and causing yield of the connection thereof to the driver when held by the holding means and providing when the carrier is released for said drive by the driver through both the first and second yieldable connections to a position at which the first yieldable connection yields and the second yieldable connection remains connected to the carrier, and means for imposing an impulse on the driver in addition to its reciprocable impulse at the beginning of each stroke in each direction.

31. In a straight knitting machine, a friction rod, a friction box, yarn carrier bars, means including elements carried by the friction box providing individual yieldable connection between the friction box and the carrier bars, means including an element on each carrier bar cooperating with one of said friction box elements providing for drive of the corresponding carrier bar by the friction rod through both the box and said yieldable connection, carrier bar operated means for selectively holding and releasing the bars relative to the friction box for preventing drive of a carrier bar and causing yield of the connection thereof to the friction box when held by the holding means and providing when the carrier bar is released for said drive by the friction box through the yieldable connection to a position at which the friction box yields relative to the friction rod and said yieldable connection remains connected to the carrier bar, and means for imposing an impulse on the friction box in addition to its reciprocable impulse at the beginning of each stroke in each direction irrespective of the lengths of the strokes.

32. In a knitting machine, a friction box, means for reciprocating said box, a plurality of yarn carrier bars and means adapted to drive them from said box, groups of stops for said bars at separated points and means for moving the stops to decrease and increase the distance between the groups, and means movable with said stops and adapted to give said box a starting impulse at the beginning of each stroke in each direction in addition to the impulse from said reciprocating means.

33. In a knitting machine, in combination, a reciprocable drive element, a reciprocable yarn carrier element to be driven by said driver element, means for establishing a driving connection between said elements, and means independent of said driver element for imposing an impulse on said yarn carrier element in the direction of, and in addition to, its impulse from said driver element at the beginning of each stroke of said driver element in each direction irrespective of the position of the yarn carrier element at the beginning of its stroke.

34. In a knitting machine, in combination, a reciprocable friction box rod, a friction box thereon, a yarn carrier element to be driven by said box, means for establishing driving connection between said box and element, and means independent of said friction rod for imposing an impulse on said friction box in the starting direction at the beginning of each stroke of said rod irrespective of the position of the yarn carrier element.

35. In a knitting machine, in combination, a reciprocable friction rod, a friction box thereon, a yarn carrier element to be driven by said box, means for establishing driving connection between said box and element, means independent of said friction rod for imposing an impulse on said friction box in the starting direction at the beginning of each stroke of said rod, and automatic means for adjusting said impulse imposing means to maintain cooperative relations between it and said friction box when the box is in different positions.

MAX RICHTER.